(12) United States Patent
Gao et al.

(10) Patent No.: US 11,995,793 B2
(45) Date of Patent: May 28, 2024

(54) GENERATION METHOD FOR 3D ASTEROID DYNAMIC MAP AND PORTABLE TERMINAL

(71) Applicant: ARASHI VISION INC., Guangdong (CN)

(72) Inventors: Ruidong Gao, Shenzhen (CN); Wenjie Jiang, Shenzhen (CN); Li Zhu, Shenzhen (CN)

(73) Assignee: ARASHI VISION INC., Guangdong (CN)

( * ) Notice: Subject to any disclaimer, the term of this patent is extended or adjusted under 35 U.S.C. 154(b) by 367 days.

(21) Appl. No.: 17/424,802

(22) PCT Filed: Oct. 21, 2019

(86) PCT No.: PCT/CN2019/112246
§ 371 (c)(1),
(2) Date: Jul. 21, 2021

(87) PCT Pub. No.: WO2020/151268
PCT Pub. Date: Jul. 30, 2020

(65) Prior Publication Data
US 2022/0092734 A1 Mar. 24, 2022

(30) Foreign Application Priority Data
Jan. 22, 2019 (CN) .......................... 201910057169.3

(51) Int. Cl.
*G06K 9/00* (2022.01)
*G06T 3/4038* (2024.01)
(Continued)

(52) U.S. Cl.
CPC .............. *G06T 3/4038* (2013.01); *G06T 7/50* (2017.01); *G06T 15/20* (2013.01)

(58) Field of Classification Search
CPC .......... G06T 3/4038; G06T 7/50; G06T 15/20
See application file for complete search history.

(56) References Cited

U.S. PATENT DOCUMENTS

| 11,276,226 B2 * | 3/2022 | Lim ..................... G06V 10/242 |
| 2011/0069152 A1 * | 3/2011 | Wang .................. H04N 13/261 |
| | | 348/43 |

(Continued)

FOREIGN PATENT DOCUMENTS

| CN | 103020900 A | 4/2013 |
| CN | 105793895 A | 7/2016 |

(Continued)

OTHER PUBLICATIONS

Map-Based Localization Using the Panoramic Horizon, Fridtjof Stein et al., IEEE, 1995, pp. 892-896 (Year: 1995).*

(Continued)

*Primary Examiner* — Jayesh A Patel
(74) *Attorney, Agent, or Firm* — Polsinelli PC (57) ABSTRACT

The present invention provides a generation method for a 3D asteroid dynamic map and a portable terminal. The method comprises: obtaining a panorama image; identifying the panorama image and segmenting into a sky region, a human body region, and a ground region; calculating a panoramic depth map for the sky region, the human body region, and the ground region; respectively transforming the panorama image and the panoramic depth map to generate an asteroid image and an asteroid depth map; generating an asteroid view under a virtual viewpoint; and rendering to generate a 3D asteroid dynamic map. By automatically generating the asteroid view under the virtual viewpoint, and synthesizing and rendering same, the technical solution of the present invention generates the asteroid dynamic map having a 3D effect from the panorama image.

15 Claims, 3 Drawing Sheets

(51) Int. Cl.
*G06T 7/50* (2017.01)
*G06T 15/20* (2011.01)

(56) References Cited

U.S. PATENT DOCUMENTS

| | | | | |
|---|---|---|---|---|
| 2012/0041722 | A1 | 2/2012 | Quan et al. | |
| 2013/0314402 | A1* | 11/2013 | Furumura | H04N 21/44012 |
| | | | | 345/619 |
| 2014/0300566 | A1* | 10/2014 | Lee | G06F 3/0488 |
| | | | | 345/173 |
| 2017/0294000 | A1* | 10/2017 | Shen | G06T 5/005 |
| 2019/0012804 | A1* | 1/2019 | Wang | G06T 3/4038 |
| 2019/0012818 | A1* | 1/2019 | Fine | H04N 5/2624 |
| 2019/0287223 | A1* | 9/2019 | Chen | H04N 23/698 |
| 2021/0264671 | A1* | 8/2021 | Chen | G09G 5/32 |

FOREIGN PATENT DOCUMENTS

| | | | | | |
|---|---|---|---|---|---|
| CN | 105959665 | A | * | 9/2016 | G06T 3/4038 |
| CN | 105959665 | A | | 9/2016 | |
| CN | 106056139 | A | * | 10/2016 | |
| CN | 106162203 | A | | 11/2016 | |
| CN | 107590850 | A | | 1/2018 | |
| CN | 108377407 | A | | 8/2018 | |
| CN | 109003237 | A | | 12/2018 | |
| CN | 109003237 | A | * | 12/2018 | G06K 9/00664 |
| CN | 109769110 | A | | 5/2019 | |
| EP | 2568439 | A2 | * | 3/2013 | G06T 7/50 |
| EP | 2627072 | A1 | * | 8/2013 | G03B 35/02 |
| JP | 2006-053694 | A | | 2/2006 | |
| JP | 2006053694 | A | * | 2/2006 | |
| JP | 2014-007715 | A | | 1/2014 | |
| WO | WO-2012046373 | A1 | * | 4/2012 | G03B 35/02 |
| WO | WO-2016048020 | A1 | * | 3/2016 | G06T 3/4038 |
| WO | 2018/154589 | A1 | | 8/2018 | |

OTHER PUBLICATIONS

Preface: The Chang'e-3 lander and rover mission to the Moon, Wing-Huen et al., RAA, 2014, pp. 1511-1513 (Year: 2014).*
Perceptual Segmentation: Combining Image Segmentation With Object Tagging, Ruth Bergman et al., IEEE, Jun. 2011, pp. 1668-1681 (Year: 2011).*
European Search Report dated Aug. 29, 2022 issued in counterpart Patent Application No. 19912004.9 (17 pages).
Japanese Office Action dated Oct. 4, 2022 issued in counterpart Patent Application No. 2021-542464 (5 pages).
Search Report issued in corresponding Chinese Patent Application No. 2019100571693 (2 pages).
International Search Report dated Jan. 21, 2020 issued in corresponding Patent Application No. PCT/CN2019/112246 (3 pages).

* cited by examiner

GENERATION METHOD FOR 3D ASTEROID DYNAMIC MAP AND PORTABLE TERMINAL

CROSS REFERENCE TO RELATED APPLICATION

The present application is a National Phase of International Application No. PCT/CN2019/112246, filed on Oct. 21, 2019 which claims priority to Chinese Patent Application No. 201910057169.3, filed on Jan. 22, 2019 and entitled "Generation Method for 3D Asteroid Dynamic Graph and Portable Terminal", and the contents of which are herein incorporated by reference in their entireties.

TECHNICAL FIELD

The present disclosure relates to the field of images, and particularly to a method for generating a 3D asteroid dynamic graph and a portable terminal.

BACKGROUND

Currently, there are already some methods to generate a 3D view from an image, for example, using the micro-lens technology to generate a 3D view. The lens of the micro-lens is a magnifying lens array which is designed to magnify different images when viewed from slightly different angles. In order to generate the 3D view, it is first necessary to generate a multi-viewpoint image, such as 12-viewpoint or more viewpoint images, and then the multi-viewpoint image is mixed into a mixed image. The mixing of the multi-view images means a process of extracting suitable pixels from the multi-viewpoint image and combining them into a new image. The new image contains multi-viewpoint information of the original image. The lens of the micro-lens is configured to display these multi-viewpoint images at different viewpoints. Finally, through the micro-lens board, the viewer's left and right eyes can see different images, thereby producing a 3D effect. The disadvantage of this method is that it requires the use of the micro-lens board rather than naked eyes to view.

Another commonly used method is to manually convert a 2D image into a multi-viewpoint image. The operator usually needs to create a skin to extract an object from a target image, and then determines depth information for the skin according to own judgment. The depth information has a grayscale image with the same size as the original 2D image; and the gray in the grayscale image represents a depth of each portion in the image. The manually created depth information is configured to guide the computer to move the pixels of the original 2D image to form a new viewpoint map. A depth map can produce a strong 3D display effect. However, it takes hours or even days to generate a 3D view by using such existing method.

In view of this, the existing method and system for generating a 3D view from an image have disadvantages such as requiring tools or long processing time, and the user experience is not high.

SUMMARY

Technical Problem

The present disclosure provides a method for generating a 3D asteroid dynamic graph, a computer-readable storage medium and a portable terminal, which aims to automatically generate asteroid views under virtual viewpoints, and synthesize the render the asteroid views to generate an asteroid dynamic graph with a 3D effect from one panoramic image. The method has a high efficiency, the image quality is good, and the user experience is higher.

Technical Solution

In the first aspect, the present disclosure provides a method for generating a 3D asteroid dynamic graph, including:
  acquiring a panoramic image;
  identifying and partitioning the panoramic image into a sky area, a human body area and a ground area;
  calculating a panoramic depth map for the sky area, the human body area and the ground area respectively;
  transforming the panoramic image and the panoramic depth map respectively to generate an asteroid image and an asteroid depth map;
  generating an asteroid view under a virtual viewpoint;
  generating a 3D asteroid dynamic graph by rendering a plurality of asteroid views under a plurality of virtual viewpoints.

In the second aspect, the present disclosure provides computer-readable storage medium that stores one or more computer programs, the one or more computer programs, when executed by a processor, implement the steps of the method for generating the 3D asteroid dynamic graph:
  acquiring a panoramic image;
  identifying and partitioning the panoramic image into a sky area, a human body area and a ground area;
  calculating a panoramic depth map for the sky area, the human body area and the ground area respectively;
  transforming the panoramic image and the panoramic depth map respectively to generate an asteroid image and an asteroid depth map;
  generating an asteroid view under a virtual viewpoint;
  generating a 3D asteroid dynamic graph by rendering a plurality of asteroid views under a plurality of virtual viewpoints.

In the third aspect, the present disclosure provides a portable terminal, including:
  one or more processors;
  a memory; and
  one or more computer programs, wherein the one or more computer programs are stored in the memory and configured to be executed by the one or more processors, the processors, when executing the computer programs, implement the steps of the method for generating the 3D asteroid dynamic graph:
  acquiring a panoramic image;
  identifying and partitioning the panoramic image into a sky area, a human body area and a ground area;
  calculating a panoramic depth map for the sky area, the human body area and the ground area respectively;
  transforming the panoramic image and the panoramic depth map respectively to generate an asteroid image and an asteroid depth map;
  generating an asteroid view under a virtual viewpoint;
  generating a 3D asteroid dynamic graph by rendering a plurality of asteroid views under a plurality of virtual viewpoints.

Advantages

In the technical solution of the present disclosure, by calculating the image depth map, automatically generating the asteroid views under the virtual viewpoints, and synthesizing the rendering the asteroid views, an asteroid dynamic graph with a 3D effect is generated from one panoramic image, which not only enhances the visual effect, but also has advantages such as a fast processing speed.

DETAILED DESCRIPTION

In order to make the objectives, technical solution, and advantages of the present disclosure clearer, the present disclosure will be described in detail with reference to the accompanying drawings and embodiments. It should be appreciated that the specific embodiments described here are only used for explaining the present disclosure, rather than limiting the present disclosure.

In order to illustrate the technical solution of the present disclosure, specific embodiments are used for description below.

Embodiment I

Figure 1:
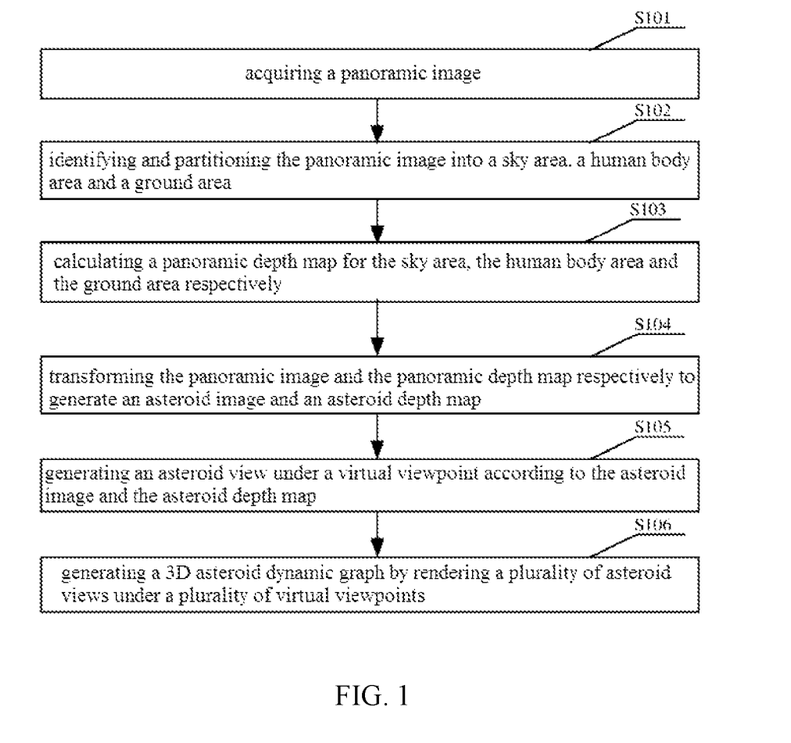
FIG. 1 is a flow chart showing a method for generating a 3D asteroid dynamic image according to an embodiment I of the present disclosure.

Referring to FIG. 1, a method or generating a 3D asteroid dynamic graph provided by the Embodiment 1 of the present disclosure includes the following steps.

S101: a panoramic image is acquired.

A panoramic image is acquired. The panoramic image can be generated by multiple fisheye images taken by at least two fisheye lenses through an optical flow stitching algorithm. The content of the panoramic image can include a picture taken by a panoramic camera held by a photographer.

S102: the panoramic image is identified and partitioned into a sky area, a human body area and a ground area.

The sky and the human body are identified from the panoramic image content and a semantic partition is performed. There are mainly three areas through the partition: sky area, human body area, and ground area.

The identifying and partition of the sky area can be performed by using a classical sky detection algorithm. The sky detection algorithm is not limited to the methods disclosed in the paper "Sky Region Detection in a Single Image for Autonomous Ground Robot Navigation" and the Chinese patent CN109003237A. The identifying and partition of the human body can be performed by using a classical image target detection algorithm. The target detection algorithm is not limited to a method disclosed in the document "Cascade R-CNN: Delving into High Quality Object Detection", etc. After the sky area and the human body area are partitioned, the remaining portion is all partitioned into the ground area, that is, the ground area can include a tall building, a house, a tree, etc.

S103: the panoramic depth map is calculated for the sky area, the human body area and the ground area;

The relative depth between different objects can reflect a three-dimensional position relationship between the objects. The depth of an object represents a distance between the object and a camera in an actual scene. Therefore, the farther the object is from the camera, the greater the depth value; and the closer the object to the camera, the smaller the depth value.

The panoramic depth map is calculated according to the sky area, the human body area, and the ground area; and the process is provided as follows.

The depth value bodyDepth of a pixel $(x_1, y_1)$ in the human body area can be calculated by a formula (1):

$$bodyDepth = minBodyDepth + \frac{(y_1 - minRowIdx) \cdot (maxBodyDepth - minBodyDepth)}{maxRowIdx - minRowIdx} \quad (1)$$

In the above formula (1), $y_1$ is the row-coordinate of the pixel $(x_1, y_1)$ in the panoramic image, $x \in [minRowIdx, maxRowIdx]$; minRowIdx is the minimum value of an row-coordinate of a pixel in the human body area; maxRowIdx is the maximum value of the row-coordinate of the pixel in the human body area; minBodyDepth is set as the minimum value of a pixel depth value in the human body area; maxBodyDepth is set as the maximum value of the pixel depth value in the human body area, where bodyDepth$\in$[minBodyDepth, maxBodyDepth].

The depth value of all pixels in the sky area is set to a fixed value skyDepth, and skyDepth$\in$(maxBodyDepth, 255].

The pixel $(x_2, y_2)$ in the ground area are partitioned into a fixed depth value area and a gradient depth value area.

A range of the row-coordinate of the fixed depth area is [2maxRowIdx-imgH, imgH], where imgH is a height of the image, that is, the maximum value of the row-coordinate, so that the depth value of the pixel in the fixed depth area is set as the fixed value maxBodyDepth.

The area in the ground area except for the fixed depth area is the gradient depth value area. The depth value of the pixel $(x_2, y_2)$ in the gradient depth value area can be calculated by a formula (2):

$$gradulDepth = edgeDepth + \frac{y_2 \cdot (maxBodyDepth - edgeDepth)}{lowIdx} \quad (2)$$

In the formula (2), $y_2$ is the row-coordinate of the pixel $(x_2, y_2)$ in the panoramic image, and $y_2 < 2maxRowIdx-imgH$; edgeDepth is a set fixed value, and edgeDepth$\in$[maxBodyDepth, skyDepth).

Figure 2:
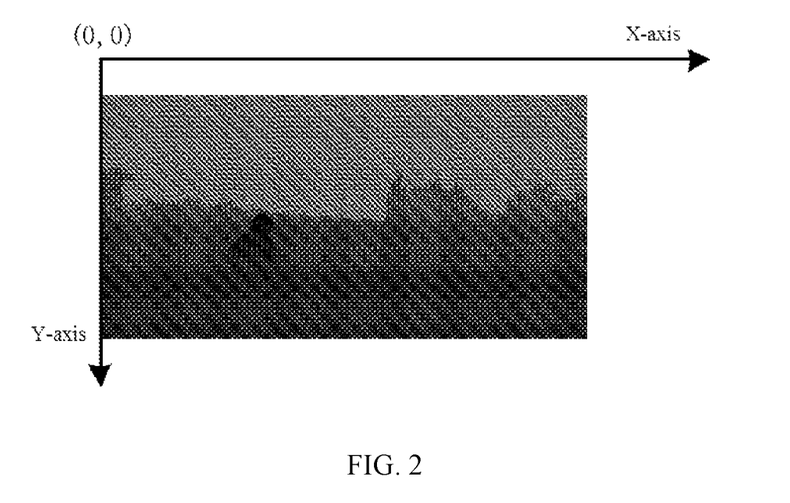
FIG. 2 is an example of a panoramic depth map according to the embodiment I of the present disclosure.

After the depth value of the human body area, the depth value of the sky area and the depth value of the ground area are calculated respectively, the panoramic depth map can be obtained, referring to FIG. 2 for an example of the panoramic depth map.

S104: the panoramic image and the panoramic depth map are transformed respectively to generate the asteroid image and the asteroid depth map.

Figure 3:
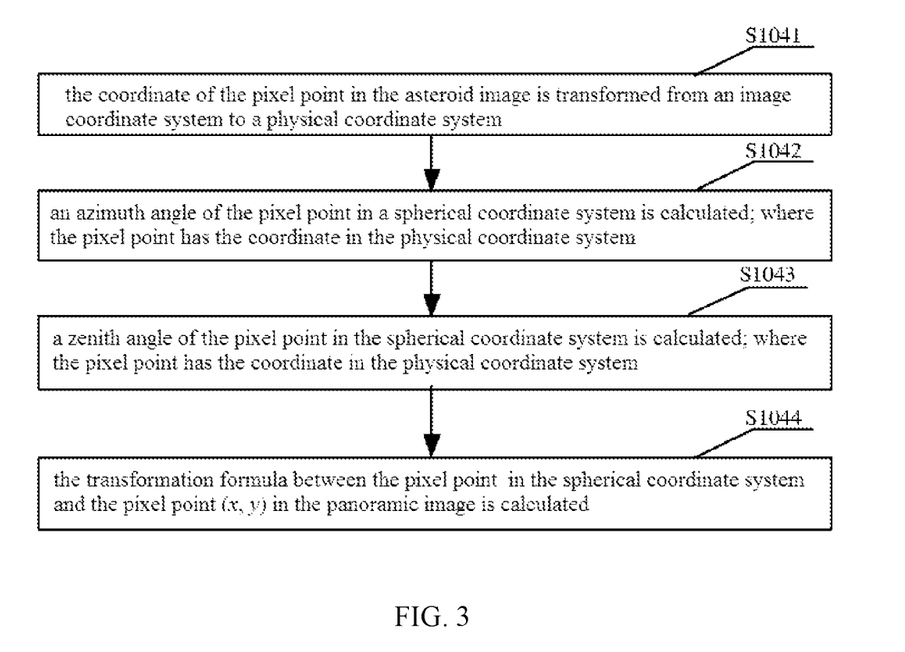
FIG. 3 is a flow chart showing a method for mapping an asteroid image to a panoramic image according to the embodiment I of the present disclosure.

Referring to FIG. 3, a method for mapping the asteroid image to the panoramic images includes the following steps.

S1041: the coordinate of the pixel point in the asteroid image is transformed from an image coordinate system to a physical coordinate system.

A south pole point of a unit ball is taken as an origin of the three-dimensional coordinates, the x-axis is to the right, the y-axis is vertically inward, and the z-axis is upward, such arrangement conforms to the right-handed coordinate system. A view point of the observer is set to be located on a line between a north pole point and a center of the unit ball; a coordinate value is denoted as (0,0,d); it is set that a projected asteroid plane is tangent to the unit ball at the coordinate origin (0,0,0); an outputted asteroid image size is set as (W, H); a coordinate (u, v) of a pixel point in the asteroid image is transformed as a coordinate (U, V) in the physical coordinate system; and the calculation formulas for U and V are a formula (3) and a formula (4) respectively as follows:

$$U = \frac{L \cdot u}{W} - \frac{L}{2} \quad (3)$$

$$V = \frac{L}{2} - \frac{L \cdot v}{H} \quad (4)$$

In the formulas (3) and (4), L=2·Radius·tan(fov·0.5), $$fov = 120 \cdot \frac{\pi}{180}$$

is a transformation formula of radian system when an angle of view is set to 120° and a radius of the unit ball satisfies that Radius=1.

S1042: an azimuth angle φ of the pixel point in a spherical coordinate system is calculated; where the pixel point has the coordinate in the physical coordinate system.

The calculation formula for φ is as follows:

$$\varphi = \begin{cases} a\cos\left(\frac{U}{r}\right) & \text{if } V \geq 0 \\ 2 \cdot \pi - a\cos\left(\frac{U}{r}\right) & \text{if } V < 0 \end{cases} \quad (5)$$

In the above formula (5), r is a radius of a latitude circle of the point (U, V) in the spherical coordinate system, r=$\sqrt{U \cdot U + V \cdot V}$.

S1043: a zenith angle θ of the pixel point in the spherical coordinate system is calculated; where the pixel point has the coordinate in the physical coordinate system.

The tangent theorem and the sine theorem are utilized to calculate the zenith angle θ of the point (U, V) in the spherical coordinate system. The calculation formula is as follows:

$$\theta = \pi - \alpha - \beta \quad (6)$$

In the formula (6), $$\alpha = \arctan2\left(\frac{r}{d}\right), \beta = \arcsin(d \cdot \sin(a)).$$

S1044: the transformation formula between the pixel point (θ, φ) in the spherical coordinate system and the pixel point (x, y) in the panoramic image is calculated.

The latitude and longitude expansion method is utilized to project the spherical coordinate (θ, φ) to the panoramic image coordinate (x, y). The calculation formula for x is as follows:

$$x = (2 \cdot \pi - \varphi) \cdot \frac{imgW}{2 \cdot \pi} \quad (7)$$

The calculation formula for y is as follows:

$$y = \theta \cdot \frac{imgH}{\pi} \quad (8)$$

According to the above method for mapping the asteroid image to the panoramic image, a reverse mapping method can be utilized to obtain the asteroid image from the panoramic image. The reverse mapping method specifically includes following steps.

A corresponding coordinate value in the panoramic image is reversely calculated from the coordinate value in the asteroid image.

Since the calculated coordinate value is floating-point type data, it is necessary to use bilinear interpolation algorithm to calculate a pixel value of the pixel point (u, v) in the asteroid image.

All the pixel points in the panoramic image are traversed, and an asteroid view can be calculated and generated.

An asteroid view is generated from the panoramic image obtained in the step S101.

An asteroid depth map is generated from the panoramic depth map calculated in the step S103.

S105: an asteroid view under a virtual viewpoint is generated according to the asteroid image and the asteroid depth map.

Figure 4:
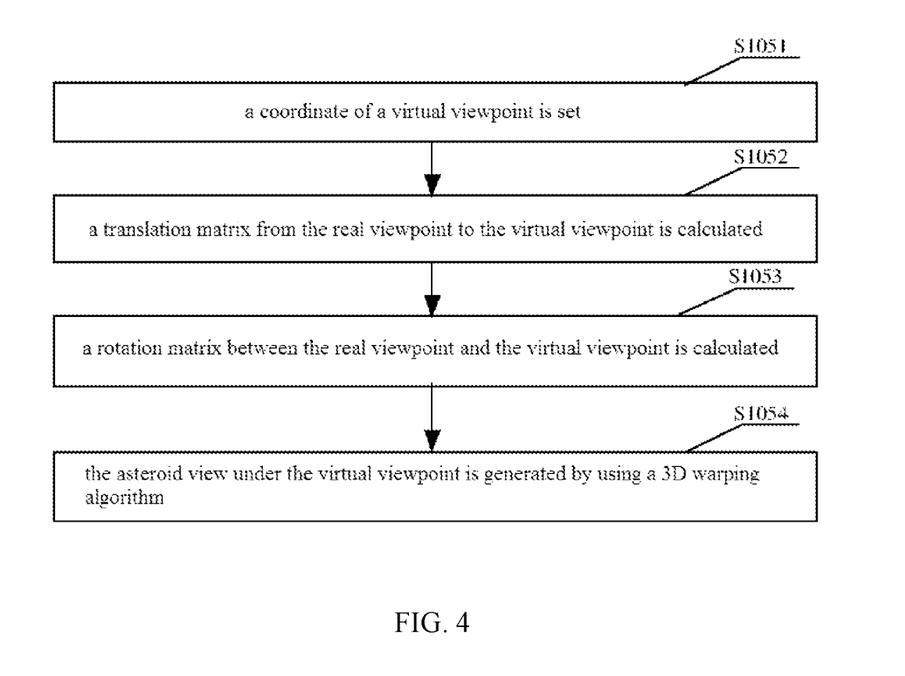
FIG. 4 is a flow chart showing a method for generating an asteroid view under a virtual viewpoint according to the embodiment I of the present disclosure.

Referring to FIG. 4, the steps of generating the asteroid view under the virtual viewpoint according to the asteroid image and the asteroid depth map includes the following steps.

S1051: a coordinate of a virtual viewpoint is set.

A real viewpoint of the asteroid image is directly above the asteroid image. A virtual viewpoint is set on a unit circular trajectory centered on the real viewpoint and parallel to the asteroid image. The coordinate of the virtual viewpoint is (x, y), with x=cos (θ), y=sin(θ), θ∈ [0,2. π]; the number of virtual viewpoints is n, and n>1.

S1052: a translation matrix T from the real viewpoint to the virtual viewpoint is calculated.

T is a 3*3 matrix, and is calculated by following formula (9):

$$\begin{cases} T_x = x \\ T_y = y \\ T_z = 0 \end{cases} \quad (9)$$

S1053: a rotation matrix R between the real viewpoint and the virtual viewpoint is calculated.

R is a 3*3 matrix, and is calculated by following formula (10):

$$\begin{cases} R_x = x \cdot \frac{\pi}{60} \\ R_y = y \cdot \frac{\pi}{60} \\ R_z = 0 \end{cases} \quad (10)$$

S1054: the asteroid view under the virtual viewpoint is generated by using a 3D warping algorithm according to the asteroid image and the asteroid depth map.

The 3D warping algorithm includes the following steps.

A two-dimensional image coordinate in an RGB image of the asteroid image and a corresponding depth value in the asteroid depth map are read; and the two-dimensional coordinate point q is backprojected to the real three-dimensional coordinate point P.

The real three-dimensional coordinate point P is rotated or translated to generate P'.

The rotated or translated virtual three-dimensional coordinate point P' is re-projected onto the two-dimensional image plane under the virtual viewpoint to generate a two-dimensional coordinate point q'; the depth value reflects a front and back occlusion relationship between the three-dimensional objects in the projection process.

The projection formula of the asteroid view under the virtual viewpoint is shown as a formula (11):

$$q' = K \cdot R \cdot K^{-1} \cdot q + K \cdot T \tag{11}$$

In the above formula (11), P is the real three-dimensional coordinate point, q is the two-dimensional coordinate point of P projected onto the two-dimensional image plane, $q = K \cdot P$; P' is the virtual three-dimensional coordinate point; and a relationship between the virtual three-dimensional coordinate point P' and the real three-dimensional coordinate point P is $P' = R \cdot P + T$. q' is the two-dimensional coordinate point of P' projected onto the two-dimensional image plane; $q' = K \cdot P'$, and K is an internal parameter matrix of the camera; the virtual camera and the real camera are arranged to have the same internal parameters.

In the process of using the 3D warping algorithm to generate the asteroid view under the virtual viewpoint, a void area without pixel information generated by the object in the original asteroid image due to the front and back occlusion is filled with adjacent pixel points.

In the generation of the asteroid view under the virtual viewpoint, since there are n virtual viewpoints (x, y), n asteroid views under the n virtual viewpoints can be generated, n>1.

S106: the 3D asteroid dynamic graph is generated by rendering a plurality of asteroid views under a plurality of virtual viewpoints.

n virtual viewpoints on the unit circular trajectory are utilized to generate n asteroid views under the n virtual viewpoints; the n asteroid views are synthesized and rendered according to a sequence or a set order of the asteroid views generated under the virtual viewpoints, to generate the asteroid dynamic graph with a 3D effect. n is a positive integer.

Embodiment II

The embodiment II of the present disclosure provides a computer-readable storage medium, and when the computer program is executed by a processor, the steps of the method for generating a 3D asteroid dynamic graph provided in the embodiment I of the present disclosure are implemented.

The computer-readable storage medium can be a non-transitory computer-readable storage medium.

Embodiment III

Figure 5:
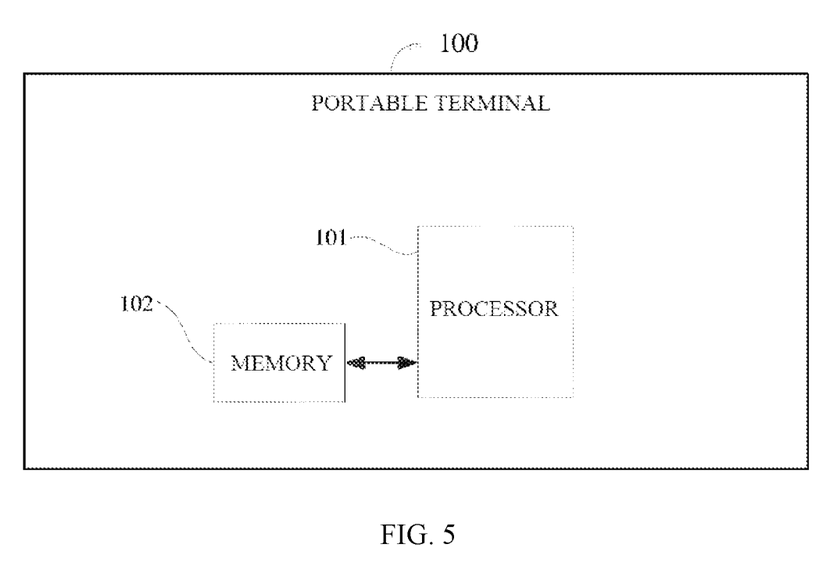
FIG. 5 is a schematic structure diagram of a portable terminal according to an embodiment III of the present disclosure.

FIG. 5 shows a specific structure block diagram of a portable terminal provided in embodiment III of the present disclosure. The portable terminal 100 includes: one or more processors 101, a memory 102, and one or more computer programs; the processor 101 is connected to the memory 102 by a bus; the one or more computer programs are stored in the memory 102, and are configured to be executed by the one or more processors 101; and the processor 101, when executing the computer programs, implements the steps of the method for generating a 3D asteroid dynamic graph provided in the embodiment I of the present disclosure.

In the embodiments of the present disclosure, those of ordinary skill in the art can understand that all or part of the steps in the methods of the above-mentioned embodiments can be implemented by a program instructing relevant hardware, and the program can be stored in a computer-readable storage medium. The storage medium mentioned is, such as ROM/RAM, a magnetic disk, an optical disk, etc.

The above are merely the preferred embodiments of the present disclosure and are not intended to limit the present disclosure. Any modification, equivalent replacement and improvement made within the spirit and principle of the present disclosure shall be regarded as the protection scope of the present disclosure.

In the present disclosure, by calculating the image depth map, automatically generating, synthesizing and rendering the asteroid views under the virtual viewpoints, the asteroid dynamic graph with the 3D effect is generated from one panoramic image, which not only enhances the visual effect, but also has advantages such as a fast processing speed.

What is claimed is:

1. A method for generating a 3D asteroid dynamic graph, comprising:
    acquiring a panoramic image;
    identifying and partitioning the panoramic image into a sky area, a human body area and a ground area;
    calculating a panoramic depth map for the sky area, the human body area and the ground area respectively;
    transforming the panoramic image and the panoramic depth map respectively to generate an asteroid image and an asteroid depth map;
    generating an asteroid view under a virtual viewpoint;
    generating a 3D asteroid dynamic graph by rendering a plurality of asteroid views under a plurality of virtual viewpoints.

2. The method for generating the 3D asteroid dynamic graph according to claim 1, wherein the identifying and partitioning the panoramic image into the sky area, the human body area and the ground area comprises:
    identifying the sky area and the human body area in the panoramic image, then partitioning the panoramic image into the sky area and the human body area, and partitioning a remaining portion of the panoramic image as the ground area.

3. The method for generating the 3D asteroid dynamic graph according to claim 1, wherein the calculating the panoramic depth map comprises calculating a depth value of the sky area, a depth value of the human body area and a depth value of the ground area respectively;
    wherein, a depth value bodyDepth of a pixel $(x_1, y_1)$ in the human body area is calculated by a formula (1):

$$bodyDepth = \min BodyDepth + \frac{(y_1 - \min RowIdx) \cdot (\max BodyDepth - \min BodyDepth)}{\max RowIdx - \min RowIdx}, \tag{1}$$

in the formula (1), $y_1$ is an row-coordinate of the pixel $(x_1, y_1)$ in the panoramic image, $x \in [\min RowIdx, \max RowIdx]$, minRowIdx is a minimum value of a row-coordinate of the pixel in the human body area, maxRowIdx is a maximum value of the row-coordinate of the pixel in the human body area, minBodyDepth is a set minimum value of a depth value of the pixel in the human body area, maxBodyDepth is a set maximum value of the depth value of the pixel in the human body area, and bodyDepth∈ [minBodyDepth, maxBodyDepth];

depth values of all pixels in the sky area are set to a fixed value skyDepth, and skyDepth∈(maxBodyDepth, 255];

pixels ($x_2$, $y_2$) in the ground area are partitioned into a fixed depth value area and a gradient depth value area;

a range of the row coordinates of the fixed depth value area is [2maxRowIdx-imgH, imgH], where imgH is a height of the panoramic image, that is, a maximum value of the row coordinate of the pixel in the panoramic image, the depth value of the pixel in the fixed depth value area is set to the fixed value max-BodyDepth;

an area outside the fixed depth value area in the ground area is taken as the gradient depth value area, and a depth value of the pixel ($x_2$, $y_2$) in the gradient depth value area can be calculated by a formula (2):

$$gradulDepth = edgeDepth + \frac{y_2 \cdot \left(\begin{array}{c}\max BodyDepth - \\ edgeDepth\end{array}\right)}{lowIdx}, \quad (2)$$

in the formula (2), $y_2$ is the row coordinate of the pixel ($x_2$, $y_2$) in the panoramic image, $y_2$<2maxRowIdx-imgH, edgeDepth is a set fixed value, and edgeDepth∈ [maxBodyDepth, skyDepth).

4. The method for generating the 3D asteroid dynamic graph according to claim 1, wherein the generating an asteroid view under a virtual viewpoint comprises:

setting a coordinate of the virtual viewpoint;

wherein a real viewpoint of the asteroid image is directly above the asteroid image, the virtual viewpoint is set on a unit circular trajectory centered on the real viewpoint and parallel to the asteroid image, the coordinate of the virtual viewpoint is (x, y), and x=cos (θ), y=sin(θ), θ∈ [0, 2·π];

calculating a translation matrix T from the real viewpoint to the virtual viewpoint;

wherein T is a 3*3 matrix, and is calculated by a formula (9):

$$\begin{cases} T_x = x \\ T_y = y; \\ T_z = 0 \end{cases} \quad (9)$$

calculating a rotation matrix R from the real viewpoint to the virtual viewpoint;

wherein R is a 3*3 matrix, and is calculated by a formula (10):

$$\begin{cases} R_x = x \cdot \frac{\pi}{60} \\ R_y = y \cdot \frac{\pi}{60}; \\ R_z = 0 \end{cases} \quad (10)$$

generating the asteroid view under the virtual viewpoint by using a 3D warping algorithm according to the asteroid image and the asteroid depth map;

wherein the 3D warping algorithm comprises:

acquiring a two-dimensional image coordinate in an RGB image of the asteroid image and a corresponding depth value in the asteroid depth map, and backprojecting a two-dimensional coordinate point q to a real three-dimensional coordinate point P;

rotating or translating the real three-dimensional coordinate point P to generate P';

re-projecting the rotated or translated virtual three-dimensional coordinate point P' to a two-dimensional image plane under the virtual viewpoint to generate a two-dimensional coordinate point q'; wherein the depth value reflects a front and back occlusion relationship between three-dimensional objects in a projection process;

wherein a projection formula of the asteroid view under the virtual viewpoint is shown as a formula (11):

$$q'=K \cdot R \cdot K^{-1} \cdot q + K \cdot T \quad (11),$$

in the formula (11), wherein P is the real three-dimensional coordinate point, q is the two-dimensional coordinate point of P projected onto the two-dimensional image plane, q=K·P, P' is the virtual three-dimensional coordinate point, a relationship between the virtual three-dimensional coordinate point P' and the real three-dimensional coordinate point P satisfies P'=R·P+ T; q' is the two-dimensional coordinate point of P' projected onto the two-dimensional image plane, q'=K·P', K is an internal parameter matrix of a camera, a virtual camera and a real camera are arranged to have a same internal parameter.

5. The method for generating the 3D asteroid dynamic graph according to claim 4, wherein in the generated asteroid view under the virtual viewpoint, since there are n virtual viewpoints (x, y), n asteroid views under the n virtual viewpoints are generated, and n>1.

6. The method for generating the 3D asteroid dynamic graph according to claim 4, wherein, in the asteroid view under the virtual viewpoint generated by using the 3D warping algorithm, a void area without pixel information generated by an object in the original asteroid image due to the front and back occlusion is filled with an adjacent pixel point.

7. The method for generating the 3D asteroid dynamic graph according to claim 1, wherein the generating the 3D asteroid dynamic graph by rendering the plurality of asteroid views under the plurality of virtual viewpoints comprises:

using n virtual viewpoints on a unit circular trajectory to generate n asteroid views under the n virtual viewpoints, synthesizing and rendering the n asteroid views in an order to generate the 3D asteroid dynamic graph, and n is a positive integer.

8. A non-transitory computer-readable storage medium that stores one or more computer programs, wherein, the one or more computer programs, when executed by a processor, perform operations to generate a 3D asteroid dynamic graph, the operations comprising:

acquiring a panoramic image;

identifying and partitioning the panoramic image into a sky area, a human body area and a ground area;

calculating a panoramic depth map for the sky area, the human body area and the ground area respectively;

transforming the panoramic image and the panoramic depth map respectively to generate an asteroid image and an asteroid depth map;

generating an asteroid view under a virtual viewpoint;

generating a 3D asteroid dynamic graph by rendering a plurality of asteroid views under a plurality of virtual viewpoints.

9. A portable terminal, comprising:
one or more processors;
a memory; and
one or more computer programs, wherein the one or more computer programs are stored in the memory and configured to be executed by the one or more processors, the processors, the one or more processors, when executing the computer programs, perform operations to generate a 3D asteroid dynamic graph, the operations comprising:
acquiring a panoramic image;
identifying and partitioning the panoramic image into a sky area, a human body area and a ground area;
calculating a panoramic depth map for the sky area, the human body area and the ground area respectively;
transforming the panoramic image and the panoramic depth map respectively to generate an asteroid image and an asteroid depth map;
generating an asteroid view under a virtual viewpoint;
generating a 3D asteroid dynamic graph by rendering a plurality of asteroid views under a plurality of virtual viewpoints.

10. The portable terminal according to claim 9, wherein the identifying and partitioning the panoramic image into the sky area, the human body area and the ground area comprises:
identifying the sky area and the human body area in the panoramic image, then partitioning the panoramic image into the sky area and the human body area, and partitioning a remaining portion of the panoramic image as the ground area.

11. The portable terminal according to claim 9, wherein the calculating the panoramic depth map comprises calculating a depth value of the sky area, a depth value of the human body area and a depth value of the ground area respectively;
wherein, a depth value bodyDepth of a pixel $(x_1, y_1)$ in the human body area is calculated by a formula (1):

$$bodyDepth = \min BodyDepth + \frac{(y_1 - \min RowIdx) \cdot \left(\max BodyDepth - \min BodyDepth\right)}{\max RowIdx - \min RowIdx}, \quad (1)$$

in the formula (1), $y_1$ is a row-coordinate of the pixel $(x_1, y_1)$ in the panoramic image, $x \in [\min RowIdx, \max RowIdx]$, minRowIdx is a minimum value of a row-coordinate of the pixel in the human body area, maxRowIdx is a maximum value of the row-coordinate of the pixel in the human body area, minBodyDepth is a set minimum value of a depth value of the pixel in the human body area, maxBodyDepth is a set maximum value of the depth value of the pixel in the human body area, and bodyDepth∈[minBodyDepth, maxBodyDepth];
depth values of all pixels in the sky area are set to a fixed value skyDepth, and skyDepth∈(maxBodyDepth, 255];
pixels $(x_2, y_2)$ in the ground area are partitioned into a fixed depth value area and a gradient depth value area;
a range of the row coordinates of the fixed depth value area is [2maxRowIdx-imgH, imgH], where imgH is a height of the panoramic image, that is, a maximum value of the row coordinate of the pixel in the panoramic image, the depth value of the pixel in the fixed depth value area is set to the fixed value maxBodyDepth;
an area outside the fixed depth value area in the ground area is taken as the gradient depth value area, and a depth value of the pixel $(x_2, y_2)$ in the gradient depth value area can be calculated by a formula (2):

$$gradulDepth = edgeDepth + \frac{y_2 \cdot \left(\max BodyDepth - edgeDepth\right)}{lowIdx}, \quad (2)$$

in the formula (2), $y_2$ is the row coordinate of the pixel $(x_2, y_2)$ in the panoramic image, $y_2 < 2\text{maxRowIdx-imgH}$, edgeDepth is a set fixed value, and edgeDepth∈[maxBodyDepth, skyDepth).

12. The portable terminal according to claim 9, wherein the generating an asteroid view under a virtual viewpoint comprises:
setting a coordinate of the virtual viewpoint;
wherein a real viewpoint of the asteroid image is directly above the asteroid image, the virtual viewpoint is set on a unit circular trajectory centered on the real viewpoint and parallel to the asteroid image, the coordinate of the virtual viewpoint is (x, y), and x=cos (θ), y=sin(θ), θ∈[0, 2·π];
calculating a translation matrix T from the real viewpoint to the virtual viewpoint;
wherein T is a 3*3 matrix, and is calculated by a formula (9):

$$\begin{cases} T_x = x \\ T_y = y; \\ T_z = 0 \end{cases} \quad (9)$$

calculating a rotation matrix R from the real viewpoint to the virtual viewpoint;
wherein R is a 3*3 matrix, and is calculated by a formula (10):

$$\begin{cases} R_x = x \cdot \frac{\pi}{60} \\ R_y = y \cdot \frac{\pi}{60}; \\ R_z = 0 \end{cases} \quad (10)$$

generating the asteroid view under the virtual viewpoint by using a 3D warping algorithm according to the asteroid image and the asteroid depth map;
wherein the 3D warping algorithm comprises:
acquiring a two-dimensional image coordinate in an RGB image of the asteroid image and a corresponding depth value in the asteroid depth map, and backprojecting a two-dimensional coordinate point q to a real three-dimensional coordinate point P;
rotating or translating the real three-dimensional coordinate point P to generate P';
re-projecting the rotated or translated virtual three-dimensional coordinate point P' to a two-dimensional image plane under the virtual viewpoint to generate a two-dimensional coordinate point q'; wherein the depth value reflects a front and back occlusion relationship between three-dimensional objects in a projection process;

wherein a projection formula of the asteroid view under the virtual viewpoint is shown as a formula (11):

$$q'=K \cdot R \cdot K^{-1} \cdot q + K \cdot T \qquad (11),$$

in the formula (11), wherein P is the real three-dimensional coordinate point, q is the two-dimensional coordinate point of P projected onto the two-dimensional image plane, q=K·P, P' is the virtual three-dimensional coordinate point, a relationship between the virtual three-dimensional coordinate point P' and the real three-dimensional coordinate point P satisfies P'=R·P+T; q' is the two-dimensional coordinate point of P' projected onto the two-dimensional image plane, q'=K·P', K is an internal parameter matrix of a camera, a virtual camera and a real camera are arranged to have a same internal parameter.

13. The portable terminal according to claim 12, wherein in the generated asteroid view under the virtual viewpoint, since there are n virtual viewpoints (x, y), n asteroid views under the n virtual viewpoints are generated, and n>1.

14. The portable terminal according to claim 12, wherein, in the asteroid view under the virtual viewpoint generated by using the 3D warping algorithm, a void area without pixel information generated by an object in the original asteroid image due to the front and back occlusion is filled with an adjacent pixel point.

15. The portable terminal according to claim 9, wherein the generating the 3D asteroid dynamic graph by rendering the plurality of asteroid views under the plurality of virtual viewpoints comprises:

using n virtual viewpoints on a unit circular trajectory to generate n asteroid views under the n virtual viewpoints, synthesizing and rendering the n asteroid views in an order to generate the 3D asteroid dynamic graph, and n is a positive integer.

* * * * *